United States Patent
Kim et al.

(10) Patent No.: US 9,991,515 B2
(45) Date of Patent: Jun. 5, 2018

(54) RECHARGEABLE LITHIUM BATTERY

(71) Applicant: SAMSUNG SDI CO., LTD., Yongin-si, Gyeonggi-do (KR)

(72) Inventors: Young-Ki Kim, Yongin-si (KR); Ick-Kyu Choi, Yongin-si (KR); Young-Hun Lee, Yongin-si (KR); Na-Ri Park, Yongin-si (KR); Soon-Rewl Lee, Yongin-si (KR); Yong-Chul Park, Yongin-si (KR); Hong-Kyu Choi, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 434 days.

(21) Appl. No.: 14/701,317

(22) Filed: Apr. 30, 2015

(65) Prior Publication Data

US 2015/0364762 A1  Dec. 17, 2015

(30) Foreign Application Priority Data

Jun. 11, 2014 (KR) .................. 10-2014-0070919

(51) Int. Cl.
| | |
|---|---|
| *H01M 4/525* | (2010.01) |
| *H01M 10/0569* | (2010.01) |
| *H01M 4/48* | (2010.01) |
| *H01M 4/505* | (2010.01) |
| *H01M 4/36* | (2006.01) |
| *H01M 4/131* | (2010.01) |
| *H01M 4/587* | (2010.01) |
| *H01M 10/0525* | (2010.01) |

(52) U.S. Cl.
CPC .......... *H01M 4/525* (2013.01); *H01M 4/131* (2013.01); *H01M 4/364* (2013.01); *H01M 4/483* (2013.01); *H01M 4/505* (2013.01); *H01M 4/587* (2013.01); *H01M 10/0525* (2013.01); *H01M 10/0569* (2013.01); *H01M 2300/004* (2013.01); *H01M 2300/0034* (2013.01)

(58) Field of Classification Search
CPC ...... H01M 4/525; H01M 4/483; H01M 4/505; H01M 4/364; H01M 4/131; H01M 4/587; H01M 10/0569; H01M 10/0525; H01M 2300/0034; H01M 2300/004
See application file for complete search history.

(56) References Cited

U.S. PATENT DOCUMENTS

2008/0160412 A1* 7/2008 Kasamatsu ........... H01M 4/525
                                                                429/223
2011/0281165 A1   11/2011 Ueda et al.

FOREIGN PATENT DOCUMENTS

| JP | 5-54889 A | 3/1993 |
|---|---|---|
| JP | 7-263028 A | 10/1995 |
| KR | 10-0823816 B1 | 4/2008 |

\* cited by examiner

*Primary Examiner* — Laura Weiner
(74) *Attorney, Agent, or Firm* — Knobbe Martens Olson & Bear LLP

(57) ABSTRACT

Disclosed is a rechargeable lithium battery that includes a positive electrode including a positive active material, a negative electrode including a negative active material, and a non-aqueous electrolyte, wherein the positive active material includes a compound represented by the following Chemical Formula 1, the negative active material includes a silicon-based compound, the compound represented by the above Chemical Formula 1 is included in an amount of about 3 wt % to about 30 wt % based on 100 wt % of the positive active material, and the silicon-based compound is included in an amount of about 3 wt % to about 10 wt % based on 100 wt % of the negative active material.

$$Li_{x1}CO_{1-y}M_yO_2 \quad \text{Chemical Formula 1}$$

In the above Chemical Formula 1,
1.05<x1<1.10, 0.03<y<0.05 and,
M includes one selected from B, Mg, Ca, Sr, Ba, Ti, V, Cr, Fe, Cu, Al, and a combination thereof.

13 Claims, 1 Drawing Sheet

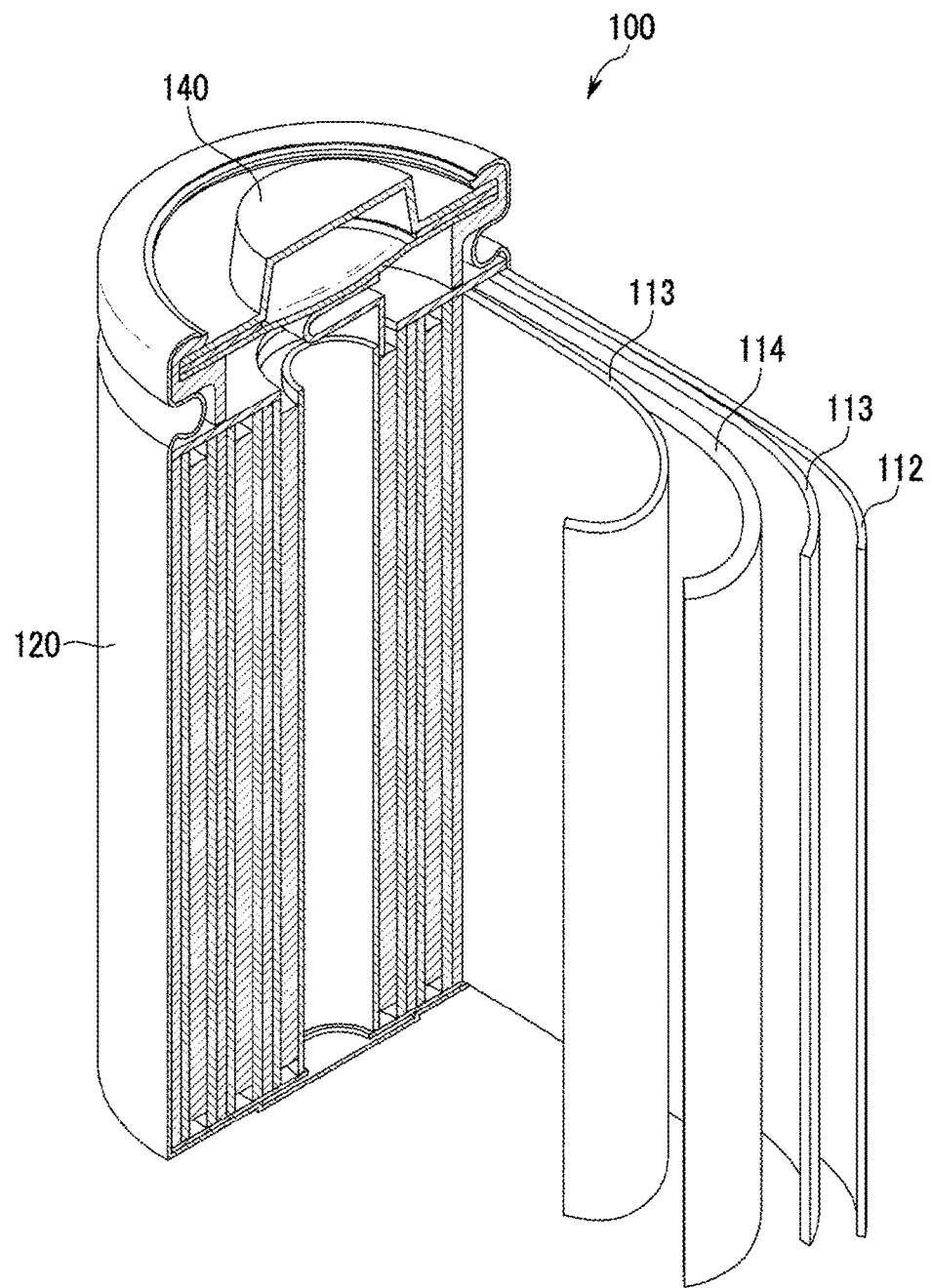

//RECHARGEABLE LITHIUM BATTERY

INCORPORATION BY REFERENCE TO ANY PRIORITY APPLICATIONS

This application claims priority to and the benefit of Korean Patent Application No. 10-2014-0070919 filed in the Korean Intellectual Property Office on Jun. 11, 2014, the entire contents of which are incorporated herein by reference.

BACKGROUND

Field

The described technology generally relates to rechargeable lithium batteries.

Description of the Related Technology

In recent times, portable electronic equipment with a reduced size and weight has been increasingly used in accordance with developments in the electronics industry.

Batteries generate electrical power using an electrochemical reaction material for a positive electrode and a negative electrode. Lithium rechargeable batteries generate electrical energy from changes of chemical potential during the intercalation/deintercalation of lithium ions at the positive and negative electrodes.

Lithium rechargeable batteries use materials that reversibly intercalate or deintercalate lithium ions during charge and discharge reactions for both positive and negative active materials and contain an organic electrolyte solution or a polymer electrolyte solution between the positive electrode and the negative electrode.

For positive active materials of a rechargeable lithium battery, lithium-transition element composite oxides capable of intercalating lithium, such as $LiCoO_2$, $LiMn_2O_4$, $LiNiO_2$, $LiNi_{1-x}Co_xO_2$ (0<x<1), $LiMnO_2$, and the like, have generally been used.

SUMMARY

One of the instant embodiments is a rechargeable lithium battery including a positive active material and a negative active material being capable of improving capacity and cycle-life characteristics.

One of the instant embodiments is a rechargeable lithium battery that includes a positive electrode including a positive active material, a negative electrode including a negative active material, and a non-aqueous electrolyte, wherein the positive active material includes a compound represented by the following Chemical Formula 1, the negative active material includes a silicon-based compound, the compound represented by the above Chemical Formula 1 is included in an amount of about 3 wt % to about 30 wt % based on 100 wt % of the positive active material, and the silicon-based compound is included in an amount of about 3 wt % to about 10 wt % based on 100 wt % of the negative active material.

$Li_{x1}CO_{1-y}M_yO_2$ 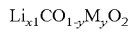 Chemical Formula 1

In the above Chemical Formula 1,
1.05<x1<1.10, 0.03<y<0.05, and
M includes one selected from B, Mg, Ca, Sr, Ba, Ti, V, Cr, Fe, Cu, Al, and a combination thereof.

In some embodiments, the weight ratio of the compound represented by the above Chemical Formula 1 and the silicon-based compound may range from about 1:1 to about 4:1.

In some embodiments, the M of the compound represented by the above Chemical Formula 1 may be Ti.

In some embodiments, the silicon-based compound is represented by the following Chemical Formula 2.

$SiO_{x2}$  Chemical Formula 2

In the above Chemical Formula 2,
0.95≤x2≤1.1.

In some embodiments, the positive active material may further include a compound represented by the following Chemical Formula 3, a compound represented by the following Chemical Formula 4, or a combination thereof.

$Li_{a1}Co_{1-b1}M_{b1}O_2$ 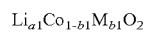 Chemical Formula 3

In the above Chemical Formula 3, 0.95≤a1≤1.05, 0≤b1≤0.02, M is Mg, Ti, Al, or a combination thereof.

$Li_a[Ni_bCo_cMn_d]O_2$  Chemical Formula 4

In the above Chemical Formula 4,
0.8≤a≤1.2, 0.05≤b≤0.9, 0.1≤c≤0.8, 0.1≤d≤0.8, and b+c+d=1.

In some embodiments, the weight ratio of the compound represented by Chemical Formula 1 and the compound comprised of either the compound of Chemical Formula 3, the compound of Chemical Formula 4, or combination of the two may range from about 3:97 to about 30:70.

In some embodiments, the negative active material may further include a carbon-based negative active material.

In some embodiments, the carbon-based negative active material may be graphite.

In some embodiments, the weight ratio of the silicon-based compound and the carbon-based negative active material may range from about 3:97 to about 10:90.

In some embodiments, the weight ratio of the silicon-based compound and the carbon-based negative active material ranges from about 3:97 to about 5:95.

In some embodiments, the negative active material further comprises graphite.

In some embodiments, the weight ratio of the compound represented by Chemical Formula 1 and the compound represented by Chemical Formula 3 is 5:95 and the weight ration of the silicon-based compound and graphite is 3:97.

In some embodiments, the non-aqueous electrolyte comprises a vinylene carbonate or an ethylene carbonate-based compound of the following Chemical Formula 6:

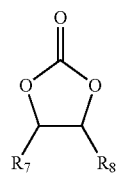

Chemical Formula 6 wherein, in the above Chemical Formula 6, $R_7$ and $R_8$ are independently hydrogen, a halogen, a cyano group (CN), a nitro group ($NO_2$) or a $C_1$ to $C_5$ fluoroalkyl group, provided that at least one of the R7 and R8 is a halogen, a cyano group (CN), a nitro group ($NO_2$) or a $C_1$ to $C_5$ fluoroalkyl group.

The instant rechargeable lithium battery embodiments have improved capacity, cycle-life and stability, and thus, may realize high power and high capacity.

BRIEF DESCRIPTION OF THE DRAWINGS

FIG. 1 is a schematic view showing a structure of a rechargeable lithium battery according to one embodiment.

DETAILED DESCRIPTION

Hereinafter, embodiments are described in detail. However, these embodiments are exemplary, and this disclosure is not limited thereto.

One embodiment provides a rechargeable lithium battery that includes a positive electrode including a positive active material, a negative electrode including a negative active material, and a non-aqueous electrolyte, wherein the positive active material includes a compound represented by the following Chemical Formula 1, the negative active material includes a silicon-based compound, the compound represented by the above Chemical Formula 1 is included in an amount of about 3 wt % to about 30 wt % based on 100 wt % of the positive active material, and the silicon-based compound is included in an amount of about 3 wt % to about 10 wt % based on 100 wt % of the negative active material.

$$Li_{x1}CO_{1-y}M_yO_2 \quad \text{Chemical Formula 1}$$

In the above Chemical Formula 1,
$1.05 < x1 < 1.10$, $0.03 < y < 0.05$,
M includes one selected from B, Mg, Ca, Sr, Ba, Ti, V, Cr, Fe, Cu, Al, and a combination thereof.

The silicon-based compound is represented by the following Chemical Formula 2:

$$SiO_{x2} \quad \text{Chemical Formula 2}$$

In the above Chemical Formula 2,
$0.95 \le x2 \le 1.1$.

For example, the compound represented by the above Chemical Formula 1 may be included in an amount of about 3 to about 20 wt % based on 100 wt % of the positive active material. Furthermore, for example, the silicon-based compound may be included in an amount of about 3 to about 5 wt % based on 100 wt % of the negative active material.

When the compounds represented by the above Chemical Formula 1 and the silicon-based compound are included within the wt % range, cycle-life characteristics of the rechargeable lithium battery may be improved by controlling a potential of the negative electrode, that is, a potential of the negative electrode during discharge of the positive electrode, to be less than or equal to about 1 V, and thus, preventing volume expansion of the silicon-based compound. In addition, a rechargeable lithium battery including a silicon-based negative active material has high irreversible capacity and thus deteriorated capacity characteristics, but when the positive active material including the compound represented by the above Chemical Formula 1 is used with the negative active material including the silicon-based compound within the range, capacity characteristics of the rechargeable lithium battery including the silicon-based negative active material may be improved. Without being bound a theory, since the compound represented by the above Chemical Formula 1 has a larger charge capacity but a smaller discharge capacity, it has a lower efficiency than a conventional lithium cobalt oxide-based (LCO-based) positive active material. Therefore, a positive electrode using the compound may have a lower potential (less than or equal to about 1 V, in comparison to about 1.4 V for a conventional LCO-based positive active material) than a positive electrode including the conventional LCO-based positive active material, which may prevent volume expansion of a negative electrode and thus, improve the cycle-life of a rechargeable lithium battery.

For example, the weight ratio of the compounds represented by the above Chemical Formula 1 and the silicon-based compound may range from about 1:1 to about 4:1, and the weight ratio range may provide a rechargeable lithium battery with improved capacity, cycle-life and stability, and realize high power and high capacity.

In some embodiments, the M of the compound represented by the above Chemical Formula 1 may be Ti. In some embodiments, charge capacity increases, but discharge capacity decreases. The increased charge capacity has an effect on initial irreversible compensation of the compound $SiO_{x2}$, and the decreased discharge capacity has an effect on controlling the potential of the compound $SiO_{x2}$.

In some embodiments, the positive active material may further include a compound represented by the following Chemical Formula 3, a compound represented by the following Chemical Formula 4, or a combination thereof.

$$Li_{a1}Co_{1-b1}M_{b1}O_2 \quad \text{Chemical Formula 3}$$

In the above Chemical Formula 3, $0.95 \le a1 \le 1.05$, $0 \le b1 \le 0.02$, M is Mg, Ti, Al, or a combination thereof.

$$Li_a[Ni_bCo_cMn_d]O_2 \quad \text{Chemical Formula 4}$$

In the above Chemical Formula 4,
$0.8 \le a \le 1.2$, $0.05 \le b \le 0.9$, $0.1 \le c \le 0.8$, $0.1 \le d \le 0.8$, and $b+c+d=1$.

In some embodiments, the positive active material of the rechargeable lithium battery may include the compound represented by Chemical Formula 1 and the compound represented by Chemical Formula 3, the compound represented by Chemical Formula 4, or a combination thereof in the weight ratio of about 3:97 to about 30:70, for example, 5:95 to about 30:70, for example about 5:95 to about 20:80. In this case, cycle-life characteristics may be improved. In some embodiments, the positive active material of the rechargeable lithium battery may include the compound represented by Chemical Formula 1 and the compound represented by Chemical Formula 3 in a weight ratio of about 3:97 to about 30:70, for example, about 5:95 to about 30:70, for example about 5:95 to about 20:80.

The compound represented by the above Chemical Formula 1 has a LCO discharge profile and thus, has a high potential when used with the compound represented by Chemical Formula 3 in the weight ratio and may improve capacity characteristics.

A rechargeable lithium battery that includes a positive active material including a compound having the composition may have initial charge and discharge efficiency ranging from about 85% to about 92%. In some embodiments, the rechargeable lithium battery may include a silicon-based negative active material.

In some embodiments, the negative active material may further include a carbon-based negative active material.

In some embodiments, the carbon-based negative active material may be graphite.

In some embodiments, the weight ratio of the silicon-based compound and the carbon-based negative active material may be about 3:97 to 10:90, for example 3:97 to 5:95. It would be appreciated that the cycle-life characteristics may be improved by adjusting the weight ratio the silicon-based compound and the carbon-based negative active material.

Classes of rechargeable lithium batteries include lithium ion batteries, lithium ion polymer batteries, and lithium polymer batteries depending on the kinds of separators and electrolytes. Rechargeable lithium batteries also may be classified to be cylindrical, prismatic, coin-type, pouch-type, and the like depending on shape. In addition, the batteries may be bulk type and thin film type depending on size. Structures and manufacturing methods for lithium ion batteries pertaining to this disclosure are known in the art.

FIG. 1 is an exploded perspective view showing an exemplary rechargeable lithium battery according to one embodiment. Referring to FIG. 1, the rechargeable lithium battery 100 is a cylindrical battery that includes a negative electrode 112, a positive electrode 114 and a separator 113 interposed between the negative electrode 112 and the positive electrode 114, an electrolyte (not shown) impregnating the negative electrode 112, positive electrode 114, and separator 113, a battery case 120 and a sealing member 140 sealing the battery case 120. The rechargeable lithium battery 100 is fabricated by sequentially laminating a negative electrode 112, a positive electrode 114, and a separator 113, spirally winding them, and housing the spirally-wound product in a battery case 120.

The negative electrode includes a current collector and a negative active material layer formed on the current collector, and the negative active material layer includes a negative active material.

The negative active material includes a silicon-based compound, and the silicon-based compound may include at least one element selected from silicon (Si), silicon oxide, silicon oxide surface-coated with conductive carbon, and silicon (Si) surface-coated with conductive carbon. For example, the negative active material may be a silicon-based compound represented by the above Chemical Formula 2.

The negative active material layer may further include a binder, and optionally a conductive material.

The binder in the negative active material layer improves binding properties of negative active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 parts by weight to 3 parts by weight based on 100 parts by weight of the negative active material.

The conductive material in the negative active material layer improves electrical conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a combination thereof.

The current collector may be a copper foil, a nickel foil, a stainless steel foil, a titanium foil, a nickel foam, a copper foam, a polymer substrate coated with a conductive metal, or a combination thereof.

The positive electrode includes a current collector and a positive active material layer formed on the current collector, and the positive active material layer includes a positive active material including a compound represented by the Chemical Formula 1 or a compound represented by the Chemical Formula 1 and a compound represented by the Chemical Formula 3, Chemical Formula 4, or a combination thereof.

The positive active material layer includes a binder and a conductive material.

The binder in the positive active material layer improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material in the positive active material layer improves conductivity of an electrode. Any electrically conductive material may be used as a conductive material, unless it causes a chemical change. Examples thereof may be one or more of natural graphite, artificial graphite, carbon black, acetylene black, ketjen black, a carbon fiber, a metal powder, a metal fiber, and the like of copper, nickel, aluminum, silver, and the like, or a polyphenylene derivative and the like.

The current collector may use Al, but is not limited thereto.

The negative electrode and the positive electrode may be manufactured by a method including mixing an active material, a conductive material, and a binder to prepare an active material composition and coating the composition on a current collector. The electrode manufacturing method is known in the art, and thus is not described in detail in the present specification. The solvent includes N-methylpyrrolidone, water and the like, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may be selected from the group consisting of a carbonate-based, ester-based, ether-based, ketone-based, alcohol-based, and an aprotic solvent. The carbonate-based solvent includes dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like, and the ester-based solvent includes methyl acetate, ethyl acetate, n-propyl acetate, methyl propionate, ethyl propionate, γ-butyrolactone, decanolide, valerolactone, mevalonolactone, caprolactone, and the like. The ether-based solvent includes dibutyl ether, tetraglyme, diglyme, dimethoxyethane, 2-methyltetrahydrofuran, tetrahydrofuran, and the like, and the ketone-based solvent includes cyclohexanone, and the like. In addition, the alcohol-based solvent may be ethanol, isopropyl alcohol, and the like. The aprotic solvent may include nitriles such as R—CN (wherein R is a hydrocarbon group having a $C_2$ to $C_{20}$ linear, branched, or cyclic structure, and may include a double bond, an aromatic ring, or an ether bond) and the like, amides such as dimethyl formamide, and the like, dioxolanes such as 1,3-dioxolane and the like, sulfolanes, and the like.

The non-aqueous organic solvent may be used singularly or in a mixture. When the organic solvent is used in a mixture, the mixture ratio may be modified in accordance with a desirable battery performance.

The carbonate-based solvent may include a mixture of a cyclic carbonate and a linear carbonate. The cyclic carbonate and the linear carbonate are mixed together in the volume ratio of about 1:1 to about 1:9.

The non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound of the following Chemical Formula 5.

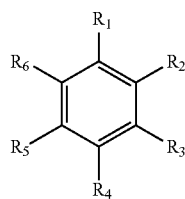

Chemical Formula 5

In the above Chemical Formula 5, $R_1$ to $R_6$ are each independently hydrogen, halogen, $C_1$ to $C_{10}$ alkyl group, $C_1$ to $C_{10}$ haloalkyl group, or a combination thereof.

The aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 6 in order to improve battery cycle-life.

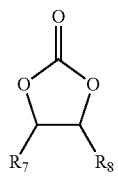

Chemical Formula 6

In the above Chemical Formula 6, $R_7$ and $R_8$ are independently hydrogen, a halogen, a cyano group (CN), a nitro group ($NO_2$) or a $C_1$ to $C_5$ fluoroalkyl group, provided that at least one of the $R_7$ and $R_8$ is a halogen, a cyano group (CN), a nitro group ($NO_2$) or a $C_1$ to $C_5$ fluoroalkyl group.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used may be adjusted to improve cycle life.

The lithium salt is dissolved in an organic solvent, supplies lithium ions in a battery, operates a basic operation of the rechargeable lithium battery, and improves lithium ion transportation between positive and negative electrodes therein. Examples of the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_nF_{2n+1}SO_2)(C_mF_{2m+1}SO_2)$, wherein x and y are natural numbers, e.g., an integer of 1 to 20, LiCl, LiI, $LiB(C_2O_4)_2$ (lithium bis(oxalato) borate, LiBOB), or a combination thereof, which may be used as a supporting salt. The lithium salt may be used in a concentration ranging from about 0.1 M to about 2.0 M. The concentration of the lithium salt may be adjusted to improve electrolyte performance and lithium ion mobility due to optimal electrolyte conductivity and viscosity.

The separator 113 may include any materials used in a lithium battery as long as separating the negative electrode 112 from the positive electrode 114 and providing a transporting passage for lithium ions. In other words, the separator may have a low resistance to ion transportation and an excellent impregnation for an electrolyte. For example, it may be a glass fiber, polyester, TEFLON (tetrafluoroethylene), polyethylene, polypropylene, polytetrafluoroethylene (PTFE) or a combination thereof, and may be non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. In some embodiments, it may have a mono-layered or multi-layered structure.

Hereinafter, the embodiments are illustrated in more detail with reference to examples. However, these examples are exemplary, and the present disclosure is not limited thereto.

EXAMPLES

Preparation Example 1: Manufacture of Positive Electrode

A mixture of $LiCoO_2$ and $Li_{1.087}Co_{0.961}Ti_{0.03902}$ in a composition ratio provided in the following Table 1 as a positive active material, polyvinylidene fluoride (Solef®

6020, Solvay Plastics, Rheinberg, Germany) as a binder, and carbon black (Denka Corp., Tokyo, Japan) as a conductive material were used in a weight ratio of 96:2:2 (active material:binder:conductive material) in NMP (n-methyl-2-pyrrolidone) as a mixing solvent to prepare slurry, and the slurry was coated on a 12 μm-thick aluminum current collector. The coated collector was dried and compressed, manufacturing a positive electrode.

Preparation Example 2: Manufacture of Negative Electrode

Graphite and silicon oxide ($SiO_{x2}$, x2=0.95 to 1.1, Shin-etsu Chemical Co., Ltd., Tokyo, Japan) powder having a composition ratio provided in the following Table 1 as a negative active material, a carboxylmethyl cellulose (CMC) binder, and styrene butadiene rubber (SBR)-based binder were used in a weight ratio of 98:1:1 (active material:CMC:SBR) in water as a mixing solvent to prepare a slurry, and the slurry was coated on a 12 μm-thick copper current collector. The coated collector was dried and compressed like the positive electrode, this manufacturing a negative electrode plate.

Examples 1 to 5 and Comparative Examples 1 to 4: Manufacture of Cell

The positive electrode according to Preparation Example 1 and the negative electrode according to Preparation Example 2 were used to manufacture a full coin cell.

An electrolyte solution was prepared by using 1.3M $LiPF_6$ and a mixture of ethylene carbonate (EC)/diethyl carbonate (DEC)/ethylmethyl carbonate (EMC) (volume ratio of 3:3:4).

Experimental Example: Cell Evaluation

Cycle-life characteristic of the cells was evaluated by charging and discharging at 0.5 C for 100 cycles, after the cell was once charged at 0.2 C, CC-CV, and 4.35 V and once discharged at 0.2 C and 3.00 V.

The evaluation results of the cells according to Examples 1 to 5 and Comparative Examples 1 to 4 were provided in the following Tables 1 and 2.

The following Table 1 provides a capacity maintenance ratio of each cell along with composition of the positive and negative active materials used for the cells according to Examples 1 to 5 and Comparative Examples 1 to 4, and the following Table 2 provides capacity and efficiency of each cell.

TABLE 1

| | Positive electrode [wt % based on the total amount, 100 wt % of positive active material] | | Negative electrode [wt % based on the total amount, 100 wt % of negative active material] | | Capacity maintenance ratio (%) after 100 cycles |
|---|---|---|---|---|---|
| | $LiCoO_2$ | $Li_{1.087}Co_{0.961}Ti_{0.039}O_2$ | graphite | $SiO_{x2}$ | |
| Example 1 | 95 | 5 | 97 | 3 | 87.51 |
| Example 2 | 95 | 5 | 95 | 5 | 90.25 |
| Example 3 | 90 | 10 | 95 | 5 | 93.38 |
| Example 4 | 85 | 15 | 95 | 5 | 90.04 |
| Example 5 | 80 | 20 | 95 | 5 | 89.22 |
| Comparative Example 1 | 100 | — | 100 | 0 | 80.53 |
| Comparative Example 2 | 100 | — | 97 | 3 | 75.64 |
| Comparative Example 3 | 100 | — | 95 | 5 | 67.83 |
| Comparative Example 4 | 95 | 5 | 100 | 0 | 82.56 |

As shown in Table 1, the cells manufactured by adjusting a mixing ratio of LCO and Ti-doped LCO according to Examples showed at most 93.38%-improved cycle-life maintenance ratio, while a conventional cell showed a cycle-life maintenance ratio of about 60% to 80%.

TABLE 2

| | Charge capacity [mAh/g] | Discharge capacity [mAh/g] | Efficiency |
|---|---|---|---|
| Example 1 | 193.76 | 177.74 | 91.73 |
| Example 2 | 193.81 | 175.69 | 90.65 |
| Example 3 | 195.30 | 176.51 | 90.38 |
| Example 4 | 196.78 | 177.22 | 90.06 |
| Example 5 | 178.86 | 177.29 | 89.60 |
| Comparative Example 1 | 192.43 | 177.17 | 92.07 |
| Comparative Example 2 | 191.78 | 176.49 | 92.05 |
| Comparative Example 3 | 192.33 | 176.46 | 91.75 |
| Comparative Example 4 | 193.71 | 178.41 | 92.10 |

The above Table 2 shows charge and discharge capacity and efficiency of the full coin cells according to Examples 1 to 5 and Comparative Examples 1 to 4.

Referring to Tables 1 and 2, the full coin cells according to Examples 1 to 5 were controlled to have low potential at a negative electrode due to low efficiency and prevented from volume expansion of the negative electrode and thus, showed improved cycle-life compared with the full coin cells according to Comparative Examples 1 to 4.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery, comprising:
a positive electrode including a positive active material;

a negative electrode including a negative active material; and a non-aqueous electrolyte, wherein the positive active material comprises a compound represented by the following Chemical Formula 1, and a compound represented by the following Chemical Formula 3, a compound represented by the following Chemical Formula 4, or a combination thereof, the negative active material comprises a silicon-based compound, the compound represented by the above Chemical Formula 1 is included in an amount of 3 wt % to 30 wt % based on 100 wt % of the positive active material, and the silicon-based compound is included in an amount of 3 wt % to 10 wt % based on 100 wt % of the negative active material:

$$Li_{x1}Co_{1-y}M_yO_2 \quad \text{Chemical Formula 1}$$

wherein, $1.05 < x1 < 1.10$, $0.03 < y < 0.05$,

M comprises one selected from B, Mg, Ca, Sr, Ba, Ti, V, Cr, Fe, Cu, Al, and a combination thereof, $$Li_{a1}Co_{1-b1}M_{b1}O_2 \quad \text{Chemical Formula 3}$$

wherein, $0.95 \le a1 \le 1.05$, $0 \le b1 \le 0.02$, M is Mg, Ti, Al, or a combination thereof, $$Li_a[Ni_bCo_cMn_d]O_2 \quad \text{Chemical Formula 4}$$

wherein, $0.8 \le a \le 1.2$, $0.05 \le b \le 0.9$, $0.1 \le c \le 0.8$, $0.1 \le d \le 0.8$, and $b+c+d=1$, and wherein the silicon-based compound is represented by the following Chemical Formula 2:

$$SiO_{x2} \quad \text{Chemical Formula 2}$$

wherein, $0.95 \le x2 \le 1.1$.

2. The rechargeable lithium battery of claim 1, wherein the compound represented by the above Chemical Formula 1 is included in an amount of 3 to 20 wt % based on 100 wt % of the positive active material.

3. The rechargeable lithium battery of claim 1, wherein the weight ratio of the compound represented by the above Chemical Formula 1 and the silicon-based compound ranges from about 1:1 to about 4:1.

4. The rechargeable lithium battery of claim 1, wherein the M of the compound represented by the above Chemical Formula 1 is Ti.

5. The rechargeable lithium battery of claim 1, wherein the weight ratio of the compound represented by Chemical Formula 1 and the compound comprised of either the compound of Chemical Formula 3, the compound of Chemical Formula 4, or combination of the two ranges from about 3:97 to about 30:70.

6. The rechargeable lithium battery of claim 1, wherein the weight ratio of the compound represented by Chemical Formula 1 and the compound comprised of either the compound of Chemical Formula 3, the compound of Chemical Formula 4, or combination of the two ranges from about 5:95 to about 20:80.

7. The rechargeable lithium battery of claim 6, wherein the negative active material further comprises graphite.

8. The rechargeable lithium battery of claim 1, wherein the negative active material further comprises a carbon-based negative active material.

9. The rechargeable lithium battery of claim 8, wherein the carbon-based negative active material is graphite.

10. The rechargeable lithium battery of claim 8, wherein the weight ratio of the silicon-based compound and the carbon-based negative active material ranges from about 3:97 to about 10:90.

11. The rechargeable lithium battery of claim 8, wherein the weight ratio of the silicon-based compound and the carbon-based negative active material ranges from about 3:97 to about 5:95.

12. The rechargeable lithium battery of claim 1, wherein the weight ratio of the compound represented by Chemical Formula 1 and the compound of Chemical Formula 3 is 5:95 and the weight ratio of the silicon-based compound and graphite is 3:97.

13. The rechargeable lithium battery of claim 1, wherein the non-aqueous electrolyte comprises a vinylene carbonate or an ethylene carbonate-based compound of the following Chemical Formula 6:

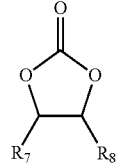

Chemical Formula 6 wherein, in the above Chemical Formula 6, $R_7$ and $R_8$ are independently hydrogen, a halogen, a cyano group (CN), a nitro group ($NO_2$) or a $C_1$ to $C_5$ fluoroalkyl group, provided that at least one of the $R_7$ and $R_8$ is a halogen, a cyano group (CN), a nitro group ($NO_2$) or a $C_1$ to $C_5$ fluoroalkyl group.

* * * * *